No. 651,732. Patented June 12, 1900.
A. WEBBER.
ICE CREAM FREEZER.
(Application filed Dec. 3, 1898.)
(No Model.) 2 Sheets—Sheet 1.
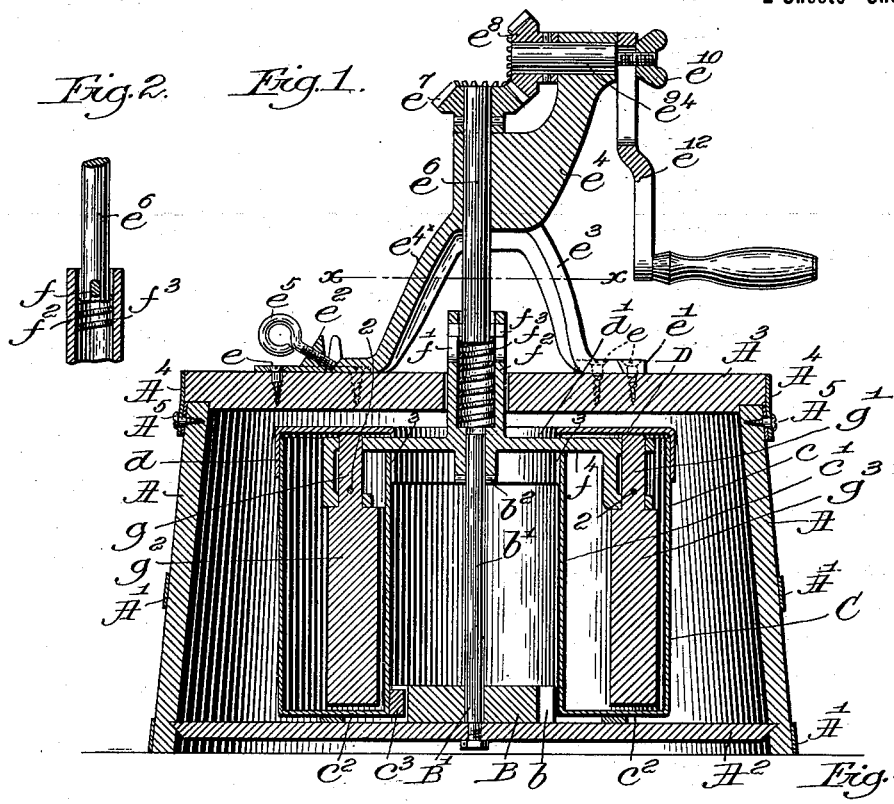
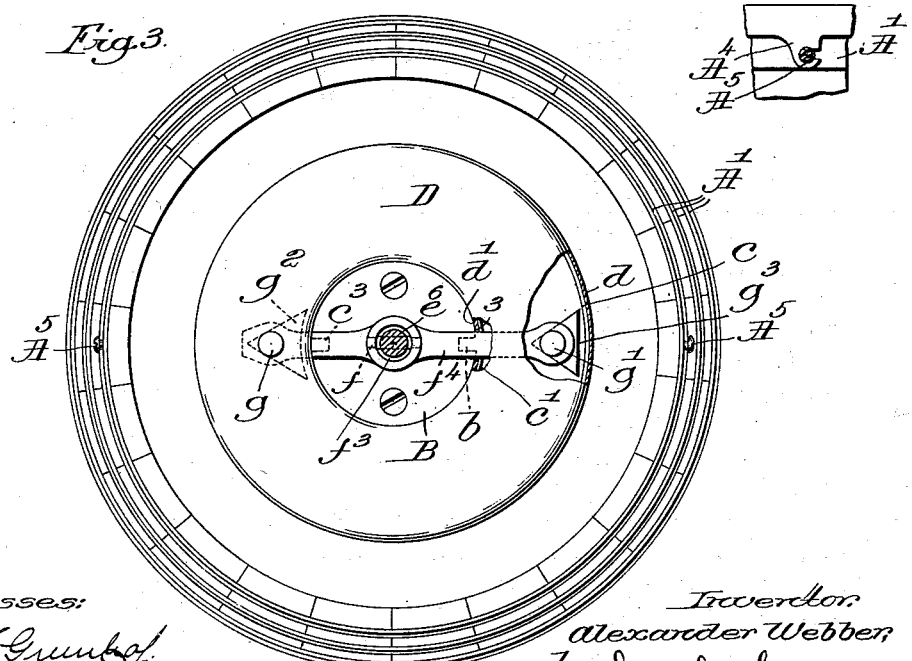
Witnesses:
Fred S. Grumb
Edward F. Allen
Inventor:
Alexander Webber
by Crosby Gregory
attys.

No. 651,732. Patented June 12, 1900.
A. WEBBER.
ICE CREAM FREEZER.
(Application filed Dec. 3, 1898.)

(No Model.) 2 Sheets—Sheet 2.

Witnesses:
Fred S. Greenleaf
Edward F. Allen

Inventor
Alexander Webber,
by Crosby Gregory
Attys.

UNITED STATES PATENT OFFICE.

ALEXANDER WEBBER, OF WINTHROP, MASSACHUSETTS, ASSIGNOR OF ONE-HALF TO GEORGE A. SEAVER, OF TOWNSEND, MASSACHUSETTS.

ICE-CREAM FREEZER.

SPECIFICATION forming part of Letters Patent No. 651,732, dated June 12, 1900.

Application filed December 3, 1898. Serial No. 698,161. (No model.)

*To all whom it may concern:*

Be it known that I, ALEXANDER WEBBER, of Winthrop, county of Suffolk, State of Massachusetts, have invented an Improvement in Ice-Cream Freezers, of which the following description, in connection with the accompanying drawings, is a specification, like letters and figures on the drawings representing like parts.

This invention has for its object to produce an ice-cream freezer capable of freezing cream quickly and easily, the freezer being so constructed that it may be readily manipulated by an unskilled person.

Figure 5:
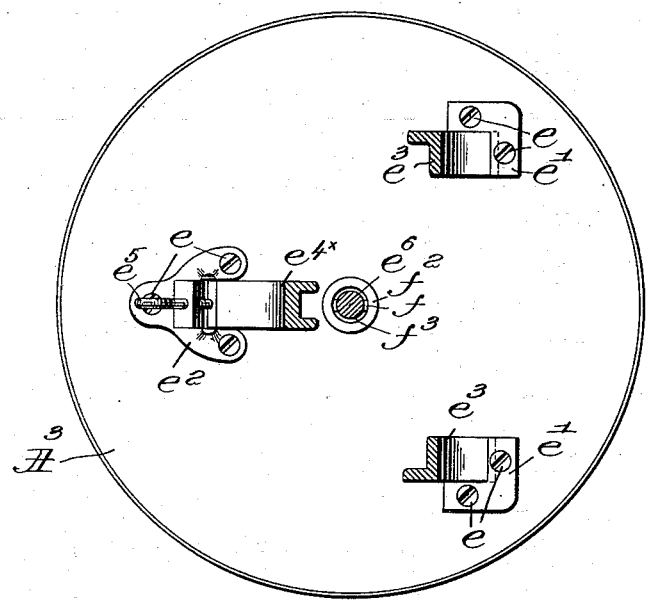
Figure 6:
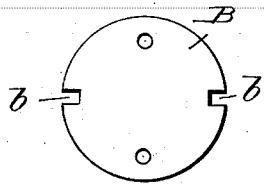

Figure 1 represents in vertical section an ice-cream freezer embodying my invention. Fig. 2 is a detail showing the manner of connecting the power driving-shaft with the stirrer. Fig. 3 is a sectional detail below the dotted line $x$, Fig. 1. Fig. 4 is a detail showing one manner of applying the top to the outside casing. Fig. 5 shows the top $A^3$ in plan view, and Fig. 6 shows the pivot-block in plan view.

In the production of my improved freezer I take a casing A, preferably composed of wood in the form of staves, held together by suitable hoops A', said casing having a bottom $A^2$ and a top $A^3$, the top having, as shown, suitable ears $A^4$, Fig. 4, which may be slotted to embrace stud-screws $A^5$, inserted in the upper hoop of the casing. Inside this casing at its center I erect a pivot-block B, (shown separately in Fig. 6,) said block having, as represented, suitable notches $b$. This block, as well as the bottom $A^2$, receives and supports centrally a standard or pivot-rod $b'$, having, preferably, as shown, a cross-pin $b^2$ near its upper end. The vessel C, to contain the cream to be frozen, is composed of a double-walled cylinder, one of the walls being marked $c$ and the other $c'$, said walls being connected by a bottom $c^2$. The vessel so constructed has, it will be noticed, a hollow open cylindrical center portion, and at the lower end of this hollow circular portion the vessel is provided with a suitable projection, as $c^3$, one or more, which enter the slots or notches $b$ of the pivot-block, so that said vessel when applied within the casing will remain stationary. It will be applied after the milk or cream to be frozen has been put into the vessel. The inner circular wall $c'$ terminates at a point below the outer circular wall $c$. To protect the milk or cream in this vessel, I apply to it a cover D, said cover having, preferably, an outer flange $d$ and an inner concentric flange $d'$, and preferably the inner flange $d'$ will be longer than the outer flange. These two flanges fit substantially snugly the double walls. Ice will be packed in the casing about the outer wall $c$, and ice will also be packed within the hollow open center of the vessel and within its inner wall $c'$, and it will be supposed at such time that the cover will be in position on the vessel.

The top has applied to it by screws $e$ suitable blocks $e'$ $e^2$, said blocks being so shaped as to receive, say, two of the feet $e^3$ of a stand $e^4$, the block $e^2$ receiving a foot $e^{4\times}$ of the said stand, the feet $e^3$ being kept seated in the blocks $e'$ and the foot $e^{4\times}$ in the block $e^2$ by means of a suitable adjusting device $e^5$, herein shown as a screw. The stand $e^4$ receives a vertical shaft $e^6$, having at its upper end a bevel-pinion $e^7$, which is engaged by a bevel-pinion $e^8$ on a short shaft $e^9$, having secured to it, preferably in an adjustable manner, as by a lock-nut $e^{10}$, a handle $e^{12}$, the rotation of said handle rotating the shaft $e^6$. The lower end of the shaft $e^6$ is slotted, as shown in Fig. 2, so that it may embrace a pin $f$, mounted to slide up and down vertically in the slots $f'$ of a cylindrical portion $f^2$ of the scraper-head or carrier, said head receiving a spring to support said pin and also having two arms $f^4$, suitably shaped to receive the reduced upper ends $g$ $g'$ of two scrapers $g^2$ and $g^3$. The scraper $g^2$ is so located with relation to the inner side of the inner wall $c'$ as to scrape from it the cream being congealed thereon, while the scraper $g^3$ is so located as to scrape and remove from the inner side of the outer wall $c$ the cream congealing thereon. The scrapers are held up in the sockets of the scraper-head by means of suitable pins 2, extended through the necks $g$ and $g'$ of the scrapers above a portion of the arms of the scraper-head. The scraper $g^2$ acts to force the cream being frozen on the inner wall $c'$ of the vessel toward the center portion of said vessel, and the scrapers $g^3$ act to scrape the frozen cream from the inner side of the outer wall, forcing it toward the inner portion of said vessel, such action enabling the frozen cream to be readily displaced and forced toward the central part of the vessel from both of its sides, letting the unfrozen cream come immediately in contact with the cold walls of the vessel, thus greatly increasing the speed at which the cream may be frozen. The sleeve $f^2$ of the scraper-head is bored, as shown, through to fit over the upper end of the pivot $b'$, the lower end of said sleeve resting on the pin $b^2$ in said pivot, said pin being so located as to stop the arms of the scraper at a point where they will substantially meet the upper end of the inner wall $c'$ of the vessel, for it will be understood that the scraper-head and scrapers rotate inside of the stationary vessel.

The inner flange $d'$ of the cover is slotted at two points, as at 3, so that when said cover is applied after putting the scraper in position in the vessel said slots may straddle the arms of the scraper, the slots fitting the sides of the scraper snugly, and thereafter the cover D is moved in unison in a circular path with the scraper, and it will be noticed that the bottom of the cover D is so located with relation to the upper outer wall of the vessel that the cover does not rest on the said vessel, but is carried by the scraper-head.

As stated, I prefer to use my ice-cream freezer in the following manner: I place the cream to be frozen in the vessel, then apply the vessel in the casing, put on the cover, and pack the vessel inside and out with ice, letting the cream stand until thoroughly chilled and preferably until the cream is congealed on the inside of the vertical walls of the vessel. I then remove the cover, put the scraper-head in position on the pivot $B'$, letting the scrapers enter the cream in the vessel, and thereafter I apply the cover and put on the top $A^3$, letting the shaft $e^6$ enter the open upper end of the sleeve, so as to engage the pin $f$. In this condition the user of the freezer may engage the handle and turn the stirrer and its cover, the vessel remaining stationary.

I find that with this apparatus I can freeze cream evenly and smoothly in a very few moments, and by reason of the cover and its long flanges there is no chance for salt to get into the cream.

Having fully described my invention, what I claim, and desire to secure by Letters Patent, is—

1. In an ice-cream freezer, a casing, a stationary vessel open at its center and having an inner and outer wall against both of which the ice may be packed, a cover for said vessel having downturned flanges to overlap the walls thereof, and a scraping member mounted for rotation and located to engage and rotate said cover.

2. In an ice-cream freezer, a casing, a vessel inclosed by said casing, and having two concentric walls each of which may receive against it ice, a pivot-pin located centrally with relation to the open center of said vessel, a stirrer-head mounted upon said pivot and provided with stirrers, a cover for said vessel movable with the stirrer-head, a fixed block disposed within the area circumscribed by the inner wall of the vessel and having a notch, a fixed projection upon the inner wall of the vessel fitted in said notch, and means for rotating said stirrer-head.

3. In an ice-cream freezer a stationary vessel having an open center and presenting two concentric walls, a casing for said vessel, a stirrer-head having means for stirring the cream or milk placed in said vessel, a cover for said vessel provided with two downturned flanges overlapping the concentric walls, and the inner flange being notched to receive said stirrer-head, and means for rotating said stirrer-head.

4. In an ice-cream freezer, a stationary vessel having an open center and presenting two concentric walls, an outer casing having a detachable top, a stand mounted on said top and provided with a vertical shaft slotted at one end, means to rotate said shaft, a stirrer-head having a sleeve extended through said top and slotted and provided with a spring and a pin, said stirrer-head having two stirrers each adapted to scrape only one wall of the vessel, substantially as described.

In testimony whereof I have signed my name to this specification in the presence of two subscribing witnesses.

ALEXANDER WEBBER.

Witnesses:
GEORGE W. GREGORY,
EMMA J. BENNETT.